(12) United States Patent
Pfaendner et al.

(10) Patent No.: US 7,683,144 B2
(45) Date of Patent: Mar. 23, 2010

(54) PROCESS FOR CHAIN STOPPING OF PVC POLYMERIZATION

(75) Inventors: Rudolf Pfaendner, Rimbach (DE); Alex Wegmann, Allschwil (CH); Thomas Wannemacher, Gersthofen (DE); Dietrich Braun, Darmstadt (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 440 days.

(21) Appl. No.: 10/513,179

(22) PCT Filed: Apr. 24, 2003

(86) PCT No.: PCT/EP03/04260

§ 371 (c)(1),
(2), (4) Date: Oct. 29, 2004

(87) PCT Pub. No.: WO03/093330

PCT Pub. Date: Nov. 13, 2003

(65) Prior Publication Data

US 2005/0222347 A1    Oct. 6, 2005

(30) Foreign Application Priority Data

May 1, 2002    (EP) .................................. 02405355

(51) Int. Cl.
*C08F 2/38*    (2006.01)
*C08F 14/06*    (2006.01)
(52) U.S. Cl. ............................. 526/82; 526/84; 526/344
(58) Field of Classification Search .................. 526/82, 526/344, 84
See application file for complete search history.

(56) References Cited

U.S. PATENT DOCUMENTS

| | | | |
|---|---|---|---|
| 3,926,910 A | 12/1975 | Mowdood | 260/45.95 |
| 4,229,598 A | 10/1980 | Weimer et al. | 568/792 |
| 4,361,683 A | 11/1982 | Dodd et al. | 526/84 |
| 4,478,986 A * | 10/1984 | Reid | 526/83 |
| 4,956,410 A * | 9/1990 | Scott et al. | 525/73 |
| 5,880,230 A * | 3/1999 | Syrinek et al. | 526/83 |
| 6,147,145 A | 11/2000 | Aumüller et al. | 524/86 |
| 6,353,107 B1 | 3/2002 | Kramer et al. | 546/216 |
| 6,379,588 B1 | 4/2002 | Sutoris et al. | 252/405 |
| 6,573,347 B1 * | 6/2003 | Wunderlich et al. | 526/218.1 |
| 2004/0132930 A1 | 7/2004 | Bonardi et al. | 526/82 |
| 2004/0138393 A1 | 7/2004 | Pfaendner et al. | 526/220 |

FOREIGN PATENT DOCUMENTS

| | | |
|---|---|---|
| EP | 0069702 | 1/1983 |
| EP | 0467848 | 1/1992 |
| WO | 02/08161 | 1/2002 |

* cited by examiner

*Primary Examiner*—William K Cheung
(74) *Attorney, Agent, or Firm*—Tyler A. Stevenson

(57) ABSTRACT

The present invention relates to a process and composition for the chain stopping of vinyl chloride polymerization or copolymerization in the presence of a stable free nitroxyl radical and a phenolic antioxidant. A further subject of the invention is the use of a stable free nitroxyl radical together with a phenolic antioxidant as a chain stopping mixture for the vinyl chloride polymerization or copolymerization. A further aspect of the invention is the use of higher sterically hindered nitroxyl radicals alone as chain stopping agents for the vinyl chloride polymerization.

12 Claims, No Drawings

PROCESS FOR CHAIN STOPPING OF PVC POLYMERIZATION

The present invention relates to a process and composition for the chain stopping of vinyl chloride polymerization or copolymerization in the presence of a stable free nitroxyl radical and a phenolic antioxidant. A further aspect of the invention is the use of a stable free nitroxyl radical together with a phenolic antioxidant as a chain stopping mixture for the vinyl chloride polymerization or copolymerization. Yet another aspect is the use of higher sterically hindered nitroxyl radicals alone as chain stopping agents for the vinyl chloride polymerization.

Polyvinyl chloride (PVC) holds a unique position amongst all the polymers produced. It is rather inexpensive and is used in such a wide range of applications that its versatility is almost unlimited. Depending on its molecular weight, additives and stabilizers, the applications range from rigid pipes and profiles to very soft, transparent and flexible films.

PVC can be produced from vinyl chloride monomer (VCM) by three different processes. The most widely used is the suspension type polymerization, which accounts for approximately 75%. Droplets of liquid vinyl chloride are dispersed in water using a protective colloid in an agitated reactor. Polymerization occurs inside the droplets as a result of the use of an oil-soluble initiator. The product is in the form of 100-150 μm diameter porous grains. Another process is the emulsion route, in which the monomer is dispersed in water, using agitation and powerful surfactants and the polymerization is carried out in the aqueous phase, using a water soluble initiator. The polymerization product is in the form of an aqueous latex dispersion of PVC particles 0.1-2.0 μm in diameter. These are spray-dried to form larger agglomerates, which are milled before being dispersed in solvents and plasticizers to give plastisols, used in a variety of spreading and dipping applications. The third route is bulk or mass polymerization. As the name implies the polymerization is carried out in vinyl chloride (VCM) in the absence of water. A review of the manufacturing of PVC is for example described in Encyclopedia of Polymer Science and Engineering, second edition, vol. 17, pages 295-376.

With regard to vinyl chloride polymerization, the overwhelming amount of polyvinyl chloride is prepared by suspension polymerization. In this process, the vinyl chloride monomer and an initiator are dispersed by agitation into a water phase at proper temperature and pressure.

Suspending agents such as methyl or ethyl cellulose, gelatin, polyvinyl alcohol or other water-soluble polymers are utilized to stabilize the suspension during the polymerization reaction. The fine granules of polymer in the form of a slurry are discharged from the reactor and centrifuged or filtered to remove the water. Thorough washing and drying of the polymer to remove traces of the suspension stabilizer and the reaction medium conclude the procedure.

Toward the end of the polymerization cycle the pressure in the system begins to drop, followed very shortly by a peak in the polymerization rate. Beyond the peak, the rate begins to drop sharply and the polymer beads become less porous as the free monomer is absorbed into the polymer. Such change in the particle character, both in terms of porosity and particle size distribution, is disadvantageous to the manufacturer in terms of reduced performance and economy of production. Thus, the granulated porous surface is desired for enhanced plasticizer uptake to form dry blends for various extruding or calendaring operations. In order to avoid such adverse effects, the manufacturer will terminate the polymerization reaction prior to complete monomer conversion. The experience of the manufacturer will best determine the point at which polymerization is terminated to give high quality polymer, although 70 to 90% conversion reflects a general termination point.

Various techniques have been adopted for terminating polymerization. A purely mechanical approach has involved discharging the polymer slurry into an evacuated stripper tank and quickly reducing the temperature and pressure to effectively stop polymerization.

Various chemical approaches have also been adopted. The numerous conventional chemical means for terminating vinyl polymerization reactions are detailed in chemical texts and publications. More recent approaches have involved adding terminating agents or chain terminators to halt free radical propagation, removing unreacted monomer and processing the converted slurry to obtain the dry polyvinyl chloride. Thus, compounds such as α-methyl styrene, bisphenol A and various hindered phenol antioxidants have been added to the reactant mix at a predetermined point for purposes of chain termination. Among these compounds, 2,6-di-tert-butyl-4-methylphenol, ie. BHT, has been most frequently utilized as a chain terminator by addition to the polymerization system at the desired termination point. Various other hindered phenols having tertiary butyl substituents in the 2- and 6-positions on the benzene ring have also been used for this purpose. The performance results have, however, been less than desirable with these hindered phenols, these materials having little effect when added in concentrations up to about 250 ppm. BHT has also exhibited this limitation in being unable to provide effective chain termination at the lower, more desirable concentration ranges.

A further PVC chain termination composition based on hindered phenols is disclosed in U.S. Pat. No. 4,229,598. This composition is prepared by the alkylation of a fractionation cut from the product of vapor phase methylation of phenol. The fraction that is alkylated is a specific mixture of cresylic acids resulting in a corresponding mixture of simple methyl-t-butylphenols. These mixtures are necessarily prepared, however, by rather complex and demanding procedures.

U.S. Pat. No. 5,880,230 discloses the use of stable free nitroxyl radicals, in particular tetramethyl piperidine compounds alone as chain stopping agents for vinyl polymerization, in particular styrene butadiene polymerizations.

It is therefore the primary object of this invention to modify vinyl chloride polymerization reactions so as to increase the efficiency of the chain termination step.

It has been surprisingly found that the combined use of phenolic antioxidants with stable free nitroxyl radicals leads to an unexpected increase in effectiveness of chain termination of vinyl chloride polymerization.

One aspect of the invention is therefore a process for chain stopping vinyl chloride polymerization, which comprises adding to the reaction system
 a) a stable free nitroxyl radical and
 b) a phenolic antioxidant.

The stable free nitroxyl radical, component a) and the phenolic antioxidant, component b) are preferably added after a monomer conversion from 50% to 97%, more preferably from 60% to 95% and most preferably from 70% to 90%.

Preferred is a process wherein the polymerization is carried out as suspension polymerization.

The suspension polymerization process is essentially a bulk polymerization process carried out in millions of small "reactors" (droplets). Liquid vinyl chloride under its autogeneous vapor pressure is dispersed in water by vigorous stirring in a reactor (autoclave). This results in the formation of droplets of for example an average size between 30-40 μm, which are stabilized against coalescence by one or more protective colloids (granulating agents). The other essential ingredient is a monomer-soluble free radical initiator. Typically such a basic formulation, also called recipe, can contain 100 parts vinyl chloride, 90-130 parts water, 0.05-0.15 parts protective colloid and 0.03-0.08 parts radical initiator. To achieve the optimum morphology other additives have to be employed, such as oxygen, buffers, secondary or tertiary granulating agents, chain transfer or chain extending agents, comonomers and antioxidants.

Typical protective colloids are cellulose ether derivatives, partially hydrolyzed polyvinyl acetates or polyvinyl alcohols. Examples for cellulose ethers are hydroxypropylmethyl-cellulose, hydroxyethyl-cellulose, hydroxypropyl-cellulose or methyl-cellulose.

Typical radical initiators are diacyl peroxides such as dilauroyl peroxide, peroxodicarbonates, such as dicyclohexyl peroxodicarbonate or dicetyl peroxodicarbonate, alkyl peroxyesters, such as t-butylperoxypivalate or α-cumyl perneodecanoate and azo initiators, such as azobisisobutyronitrile. It is advantageous to select an initiator with a half life of 1-10 hours, preferably 2-5 hours at the polymerization temperature.

The stable free nitroxyl radical is preferably added in an amount of from 0.001 to 1%, more preferably 0.005% to 0.5% and most preferably from 0.01% to 0.1% by weight, based on the weight of the initial vinyl chloride.

The phenolic antioxidant is preferably added in an amount of from 0.001 to 1%, more preferably 0.005% to 0.5% and most preferably from 0.01% to 0.1% by weight, based on the weight of the initial vinyl chloride.

The ratio of the phenolic antioxidant to stable free nitroxyl radical is preferably from 20:1 to 1:20, more preferably from 10:1 to 1:10 and most preferably from 5:1 to 1:5.

The reaction temperature is preferably between 40° C. and 95° C. and the pressure between 5 and 30 bar.

Suitable stable free nitroxyl radicals are known and in many publications described as being useful for stable free radical mediated polymerization processes.

Stable free radicals having a structural element

are for example disclosed in EP-A-621 878.

WO 98/30601 for example discloses specific nitroxyls based on imidazolidinones. In addition WO 98/44008 discloses specific nitroxyls based on morpholinones, piperazinones and piperazinediones.

Further examples such as

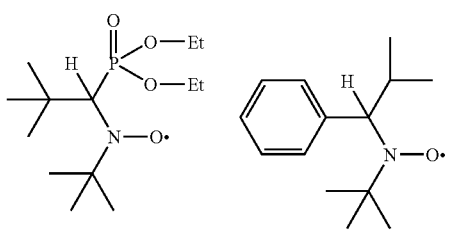

are given in WO 96/24620 and WO 00/53640.

Further suitable compounds and their manufacture are for example described in U.S. Pat. No. 4,581,429, U.S. Pat. No. 5,721,320, U.S. Pat. No. 5,627,248 or in WO 98/13392, Preferred compounds are of formula A, B or O,

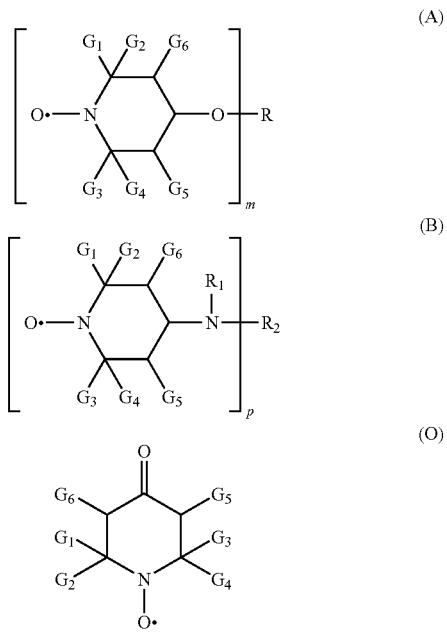

wherein $G_1, G_2, G_3, G_4$ are independently alkyl of 1 to 4 carbon atoms or $G_1$ and $G_2$ or $G_3$ and $G_4$, or $G_1$ and $G_2$ and $G_3$ and $G_4$ together are pentamethylen;

$G_5, G_6$ are independently hydrogen or $C_1$-$C_4$alkyl;

R if m is 1, is hydrogen, $C_1$-$C_{18}$alkyl which is uninterrupted or $C_2$-$C_{18}$alkyl interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms; or R is a monovalent radical of a carbamic acid or phosphorous containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms; or R is a divalent radical of a phosphorus-containing acid or a divalent silyl radical;

R, if m is 3, is a trivalent radical of an aliphatic, cycloaliphatic or aromatic tricarboxylic acid;

R, if m is 4, is a tetravalent radical of an aliphatic, cycloaliphatic or aromatic tetracarboxylic acid;

p is 1;

$R_1$ is $C_1$-$C_{12}$alkyl, $C_5$-$C_7$-cycloalkyl or benzoyl;

$R_2$ is $C_1$-$C_{12}$alkyl, $C_5$-$C_7$-cycloalkyl or a group of the formula —CO-Z wherein Z is hydrogen, methyl or phenyl.

Particularly preferred are compounds of formula A, B or 0, wherein $G_1$, $G_2$, $G_3$, $G_4$ are methyl and $G_5$ and $G_6$ are hydrogen or $G_1$ and $G_3$ are methyl and $G_2$ and $G_4$ are ethyl, $G_5$ is methyl and $G_6$ is hydrogen;

R, if m is 1, is hydrogen, $C_1$-$C_{18}$alkyl which is uninterrupted or $C_2$-$C_{19}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an a,b-unsaturated carboxylic acid having 3 to 5 carbon atoms or of an aromatic carboxylic acid having 7 to 15 carbon atoms;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms;

p is 1;

$R_1$ is $C_1$-$C_{12}$alkyl, $C_5$-$C_7$cycloalkyl or benzoyl;

$R_2$ is $C_1$-$C_{18}$alkyl, $C_5$-$C_7$cycloalkyl or a group of the formula of the formula —CO-Z wherein Z is hydrogen, methyl or phenyl.

Most preferred are compounds according to formula A.

Specific examples are:

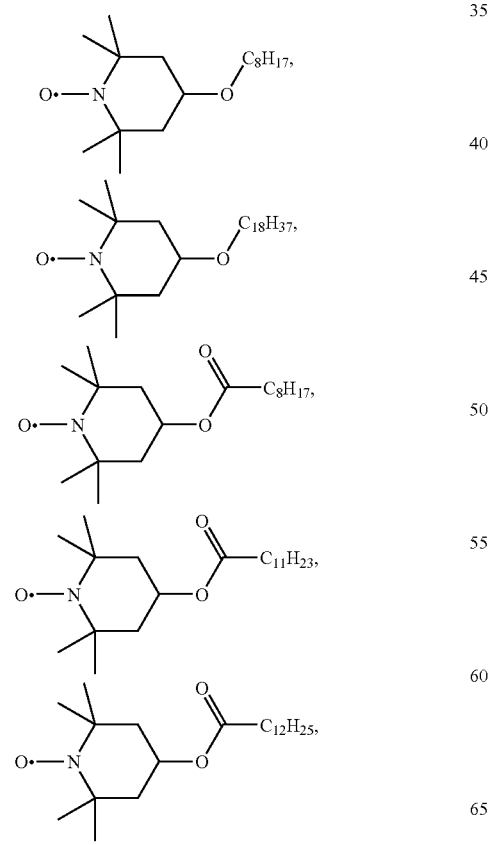

-continued

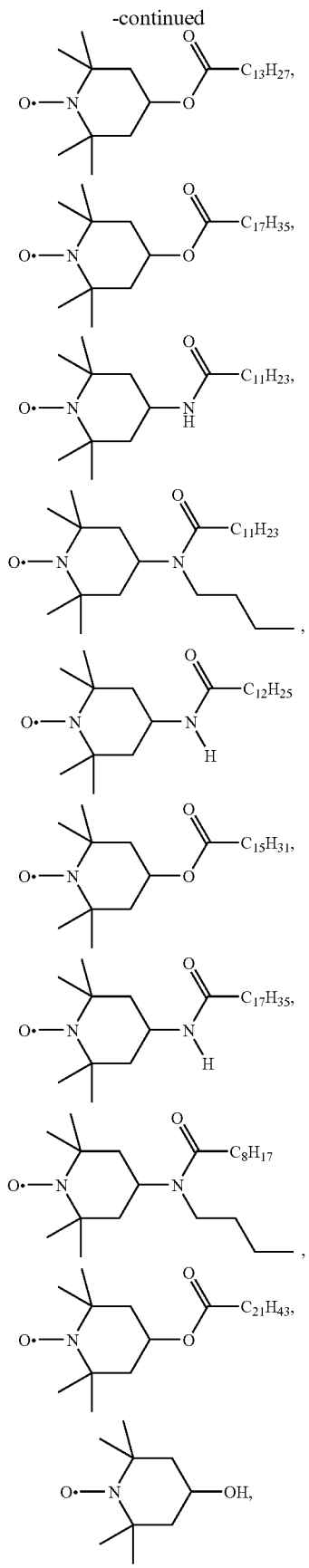

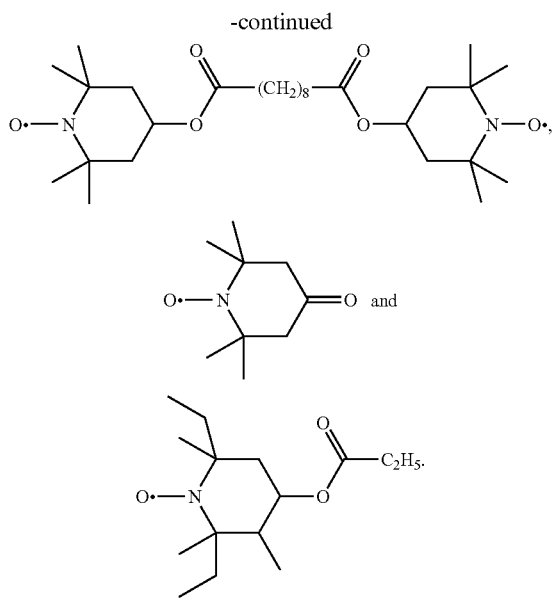

Particularly suitable compounds, such as mentioned above are partially commercially available or they are prepared from the corresponding tetramethyl piperidines by known methods. Higher alkyl substituted piperidines and their preparation are for example described in GB 2 335 190 and in GB 2 361 235.

Another preferred group of nitroxyl radicals are those of formula (Ic'), (Id'), (Ie'), (If'), (Ig') or (Ih')

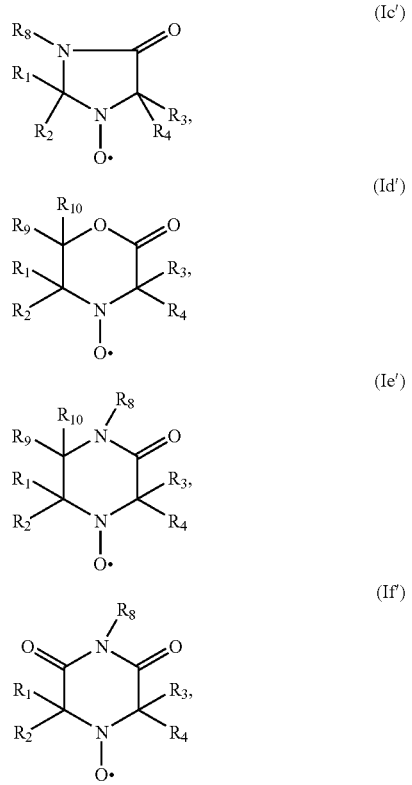

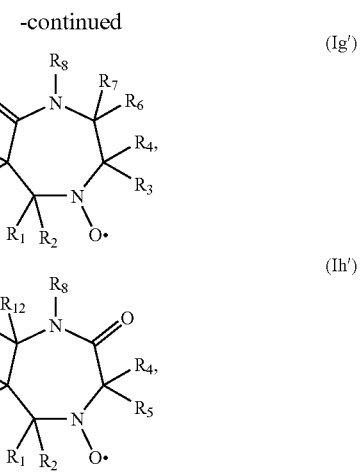

wherein $R_1$, $R_2$, $R_3$ and $R_4$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl or $R_1$ and $R_2$ and/or $R_3$ and $R_4$ together with the linking carbon atom form a $C_3$-$C_{12}$cycloalkyl radical;

$R_5$, $R_6$ and $R_7$ independently are hydrogen, $C_1$-$C_{18}$alkyl or $C_6$-$C_{10}$aryl;

$R_8$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl, $C_7$-$C_9$phenylalkyl, $C_5$-$C_{10}$heteroaryl, —C(O)-$C_1$-$C_{18}$alkyl, —O—$C_1$-$C_{18}$alkyl or —COO$C_1$-$C_{18}$alkyl; and $R_9$, $R_{10}$, $R_{11}$ and $R_{12}$ are independently hydrogen, phenyl or $C_1$-$C_{18}$alkyl.

Preferably in formula (Ic'), (Id'), (Ie'), (If'), (Ig') and (Ih') at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$-$C_6$cycloalkyl radical and one of the remaining substituents is ethyl, propyl or butyl.

The above compounds and their preparation is described in GB 2342649.

Yet another preferred group of compounds are those wherein the stable free nitroxyl radical has a hydrogen atom bound to the carbon atom in α-position to the nitrogen atom. Examples and their preparation are given in WO 00/53640.

Phenolic antioxidants useful in the present invention are known in the art as heat stabilizers for polymers during use and processing. Examples are given below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-di-methyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, b-tocopherol, g-tocopherol, d-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, 1-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, 1-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)ox-amide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)ox-amide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of b-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

Preferred are phenolic antioxidants of formula I

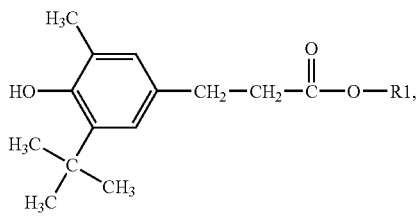

wherein $R_1$ is $C_1$-$C_{20}$alkyl or a group —$(CH_2$—$CH_2$—$O)_n$—$R_2$, wherein n is a number from 1-4 and $R_2$ is a group

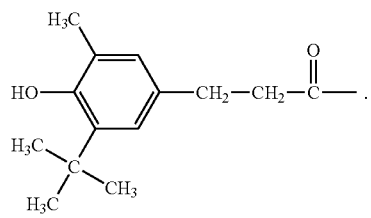

Most preferred is the reaction product of β-(5-tert-butyl-4-hydroxy-3-methylphenyl)propionic acid and triethylene glycol, Irganox 245® and Irganox 1141®, a blend of 80% 2,4-dimethyl-6-(1'-methyltridec-1'-yl)phenol and 20% β-(3,5-di-tert-butyl-4-hydroxyphenyl)propionic acid octadecyl ester (CIBA Specialty Chemicals).

Also preferred are the phenols described in U.S. Pat. No. 5,098,945.

The nitroxyl radical, component a) and the phenolic antioxidant, component b) may be added together or subsequently to the polymerization reaction mixture in pure form. They may alternatively be dissolved in a suitable organic solvent or emulgated or dispersed in water and then added to the reaction mixture.

A further aspect of the instant invention is a composition comprising
a) a stable free nitroxyl radical,
b) a phenolic antioxidant and
c) vinyl chloride monomer.

Still a further aspect of the invention is the use of
a) a stable free nitroxyl radical and
b) a phenolic antioxidant as a chain stopping mixture in vinyl chloride polymerization processes.

Definitions and preferences are already mentioned above and apply also for the further aspects of the invention.

Yet another aspect of the invention is a process for chain stopping vinyl chloride polymerization, which comprises adding to the reaction system a stable free nitroxyl radical of formula (I), (II), (III), (IV), (V), (VI), (VII), (VIII) or (IX)

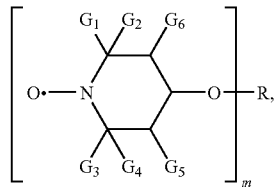
(I)

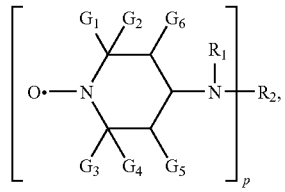
(II)

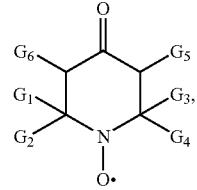
(III)

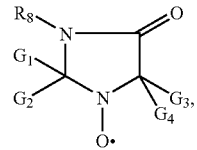
(IV)

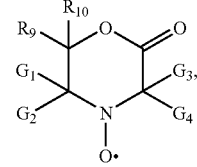
(V)

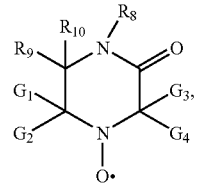
(VI)

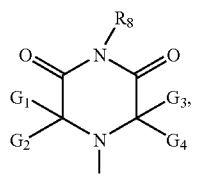
(VII)

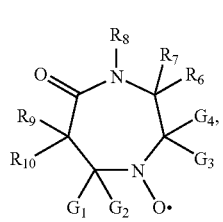
(VIII)

-continued (IX)

$$\begin{array}{c} R_8 \\ R_{12} \\ R_{11} \\ R_9 \\ R_{10} \\ G_1 \quad G_2 \quad O\bullet \end{array} \begin{array}{c} \\ N \\ \\ G_4, \\ G_3 \end{array}$$

wherein $G_1$, $G_2$, $G_3$, $G_4$ are independently alkyl of 1 to 4 carbon atoms or $G_1$ and $G_2$ or $G_3$ and $G_4$, or $G_1$ and $G_2$ and $G_3$ and $G_4$ together are pentamethylen, with the proviso that if $G_1$-$G_4$ are $C_1$-$C_4$alkyl at least one is ethyl propyl or butyl;

$G_5$, $G_6$ are independently hydrogen or $C_1$-$C_4$alkyl;

R if m is 1, is hydrogen, $C_1$-$C_{18}$alkyl which is uninterrupted or $C_2$-$C_{18}$alkyl interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms; or R is a monovalent radical of a carbamic acid or phosphorous containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms; or R is a divalent radical of a phosphorus-containing acid or a divalent silyl radical;

R, if m is 3, is a trivalent radical of an aliphatic, cycloaliphatic or aromatic tricarboxylic acid;

R, if m is 4, is a tetravalent radical of an aliphatic, cycloaliphatic or aromatic tetracarboxylic acid;

p is 1;

$R_1$ is $C_1$-$C_{12}$alkyl, $C_5$-$C_7$cycloalkyl or benzoyl;

$R_2$ is $C_1$-$C_{12}$alkyl, $C_5$-$C_7$cycloalkyl or a group of the formula —CO-Z wherein Z is hydrogen, methyl or phenyl;

$R_5$, $R_6$ and $R_7$ independently are hydrogen, $C_1$-$C_{18}$alkyl or $C_6$-$C_{10}$aryl;

$R_8$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_5$, $C_2$-$C_{10}$alkyl which is interrupted by at least one O atom and/or $NR_5$ group, $C_3$-$C_{12}$cycloalkyl or $C_6$-$C_{10}$aryl, $C_7$-$C_9$phenylalkyl, $C_5$-$C_{10}$heteroaryl, —C(O)-$C_1$-$C_{18}$alkyl, —O—$C_1$-$C_{18}$alkyl or —COO$C_1$-$C_{18}$alkyl; and $R_9$, $R_{10}$, $R_{11}$ and $R_{12}$ are independently hydrogen, phenyl or $C_1$-$C_{18}$alkyl.

The compounds of formulae (I) to (IX) are characterized in that the steric hindrance around the nitrogen atom is increased by at least one higher alkyl substituent such as ethyl propyl or butyl. This principle of using nitroxyl radicals with high steric hindrance as chain stopping alone has so far not been disclosed in the prior art. The chain stopping activity is excellent as demonstrated in example 5.

In a specific embodiment of the invention the process is carried out with a compound of formula (I) to (IX) wherein $G_1$ and $G_3$ are methyl and $G_2$ and $G_4$ are ethyl, $G_5$ is methyl and $G_6$ is hydrogen; or $G_1$ and $G_2$ are ethyl and $G_3$ and $G_4$ are methyl; and $G_5$ and $G_6$ are hydrogen.

Preferably the stable free nitroxyl radical is of formula (I), (I) or (III).

Also subject of the invention is the use of a stable free nitroxyl radical of formula (I), (II) or (Ill) as chain stopping agent in vinyl chloride polymerization processes.

The polyvinylchloride prepared in accordance with the present invention can be converted into the desired shape in a known manner. Methods of this type are, for example, grinding, calendering, extrusion, injection moulding, sintering or spinning, furthermore extrusion blow moulding or conversion by the plastisol process. It can also be converted into foams.

The polyvinylchloride prepared according to the invention is particularly suitable for semirigid and flexible formulations, in particular in the form of flexible formulations for wire sheaths and cable insulations, which is particularly preferred. In the form of semirigid formulations it is particularly suitable for decorative films, foams, agricultural sheeting, tubes, sealing profiles and office films.

In the form of rigid formulations it is particularly suitable for hollow articles (bottles), packaging films (thermoformed films), blown films, crash-pad films (automobiles), tubes, foams, heavy profiles (window frames), light-wall profiles, building profiles, sidings, fittings, office films and equipment housings (computers and domestic applicances).

Examples of the use of the polyvinylchloride as plastisols are artificial leather, floor coverings, textile coatings, wall coverings, coil coatings and automobile underseal.

The following examples illustrate the invention.
The following examples illustrate the invention.

EXAMPLES 1-4, COMPARATIVE EXAMPLES 1-4

General Experimental Description

The polymerization is carried out according to the suspension process in batch operation. A double jacketed pressure reactor of a volume of 1000 ml is operated at a temperature of 58° C. and 70° C. at a stirrer velocity of 1000 rpm. The pressure amounts to 9-12 bar depending on the temperature used for the polymerization. The pressure was recorded digitally (Buechi, bds.sc), the temperature in the reactor is also recorded.

The following recipe is added into the reactor 200 ml $H_2O$ demin., degassed 75 g vinyl chloride 3.7, 99,97% stabilized (supplier: Messer Griesheim)

300 mg polyvinyl alcohol (mowiol 8-88x, supplier: Clariant)

0,1 mol-% based on vinyl chloride of Ethyl-3,3-Di(tert-butylperoxy)butyrate 75% in isodecane (Luperox 233M®, supplier: Atofina)

Furthermore the additives (nitroxyls and antioxidants) were added in the described amount either at the beginning of the reaction (Table 1, examples 1-2 and comparative examples 1-4) or after a certain polymerization time as indicated in Table 2, Examples 3-4).

After a reaction time of 7 hours, the obtained polymer is isolated by filtration.

The obtained crude polymer is washed with water, filtered, washed with ethanol, dried under vacuum at 40° C. until weight remains constant.

Molecular weights are determined by GPC (3 columns, PL polymer laboratories), calibrated with narrow distributed polystyrene standards.

Compounds Used:

Irganox 1141®: blend of 80% 2,4-dimethyl-6-(1'-methyl-tridec-1'-yl)phenol and 20% β-(3,5-di-tert-butyl-4-hydroxyphenyl)propionic acid octadecyl ester

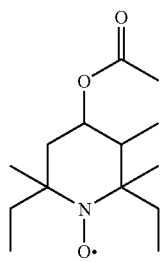

Nitroxyl 1 (prepared according to GB 2 335 190 and 2361236 respectively):

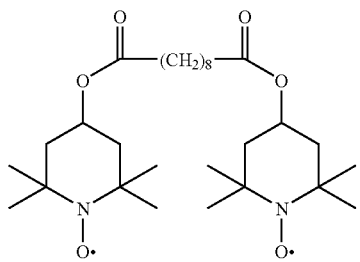

Prostab 5415® from Ciba Specialty Chemicals

The results are presented in Table 1 and 2.

TABLE 2

| Examples | Polymerization Temperature [° C.] | Additive(s) | Addition of Additives After Start of Polymerization (min) | Pressure Difference (bar) | Yield (%) |
|---|---|---|---|---|---|
| Example 3 | 70 | 125 ppm Irganox 1141 + 125 ppm Prostab 5415 | 140 | 1.4 | 85 |
| Example 4 | 70 | 125 ppm Irganox 1141 + 125 ppm Prostab 5415 | 400 | 0.4 | 80 |

EXAMPLE 5

In deviation from the general experimental description, this reaction was carried out in a 5 liter lab reactor. 300 ppm Nitroxyl 1 are added at the beginning of the pressure drop (after 3 h reaction time), after a further reaction time of 1 hour, the obtained polymer was isolated by filtration.

The obtained crude polymer was washed with water, filtered, washed with ethanol, dried under vacuum at 40° C. until the weight remains constant.

TABLE 3

| Examples | Polymerization Temperature [° C.] | Additive(s) | Pressure Difference (bar) | Yield [%] |
|---|---|---|---|---|
| Example 5 | 58 | 300 ppm Nitroxyl 1 | 0 | 88 |

Explanation to the Tables.

The polymerization of gaseous vinylchloride in a closed system such as an autoclave results in consumption of the monomer with time. Consumption of the monomer reduces at the same time the initial pressure within the system according to the available amount of monomer. The monomer consumption and the polymerization process can therefore be monitored by measuring the pressure in the reaction vessel. As

TABLE 1

| Examples | Polymerization Temperature [° C.] | Additive(s) | Pressure Difference (bar) | Yield (%) | $M_n/M_W$ |
|---|---|---|---|---|---|
| Comparative Example 1 | 58 | 250 ppm Irganox 1141 | 7.2 | 80 | 34000/85000 |
| Comparative Example 2 | 58 | 250 ppm Prostab 5415 | 4.3 | 80 | 40000/117000 |
| Example 1 | 58 | 125 ppm Irganox 1141 + 125 ppm Prostab 5415 | 3.5 | 72 | 40000/101000 |
| Comparative Example 3 | 70 | — | 10.5 | 84 | 29000/93000 |
| Comparative Example 4 | 70 | 250 ppm Irganox 1141 | 8.5 | 90 | 30000/67000 |
| Example 2 | 70 | 125 ppm I. 1141 + 125 ppm Nitroxyl 1 | 6.9 | 78 | 33000/69000 | soon as the polymerization is retarded or stopped the pressure change will be significantly slower or the pressure will reach a constant value. Therefore, to evaluate the chain stopping activity of an additive it is sufficient to measure under defined conditions the pressure after a given polymerization time. In the presence of a weak chain-stopper the polymerization reaction will take place without being influenced, the monomer consumption is high and the pressure difference between start point and end point of the experiment is large. In the presence of an efficient chain stopper the polymerization will be retarded or stopped as well as the further consumption of the monomer. Therefore, the resulting pressure difference will be low.

In the instant examples the efficiency of the chain stopping agent is proven by a low pressure difference. The inventive combinations show clearly a synergistic effect.

The invention claimed is:

1. A process for chain stopping vinyl chloride polymerization, which process comprises adding to a vinyl chloride polymerization reaction system
   a) a stable free nitroxyl radical and
   b) a phenolic antioxidant
wherein the reaction system comprises initial unreacted vinyl chloride monomer or unreacted vinyl chloride monomer and partially polymerized vinyl chloride monomer,
where the nitroxyl radical is of formula (A), (B) or (O)

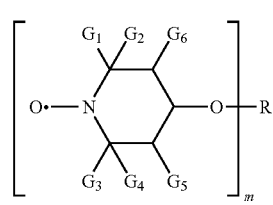
(A)

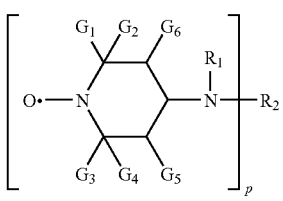
(B)

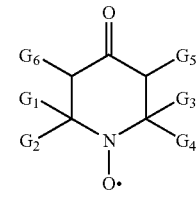
(O)

wherein
  $G_1$, $G_2$, $G_3$, $G_4$ are independently alkyl of 1 to 4 carbon atoms or $G_1$ and $G_2$, or $G_3$ and $G_4$, or $G_1$ and $G_2$, and $G_3$ and $G_4$ together are pentamethylene;
  $G_5$, $G_6$ are independently hydrogen or $C_1$-$C_4$alkyl;
  R, if m is 1, is hydrogen, $C_1$-$C_{18}$alkyl which is uninterrupted or $C_2$-$C_{18}$alkyl interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or of an aromatic carboxylic acid having 7 to 15 carbon atoms; or R is a monovalent radical of a carbamic acid or phosphorous containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms; or
  R is a divalent radical of a phosphorus-containing acid or a divalent silyl radical;
  R, if m is 3, is a trivalent radical of an aliphatic, cycloaliphatic or aromatic tricarboxylic acid;
  R, if m is 4, is a tetravalent radical of an aliphatic, cycloaliphatic or aromatic tetracarboxylic acid;
  p is 1;
  $R_1$ is $C_1$-$C_{12}$alkyl, $C_5$-$C_7$cycloalkyl or benzoyl; and
  $R_2$ is $C_1$-$C_{12}$alkyl, $C_5$-$C_7$cycloalkyl or a group of the formula —CO-Z wherein Z is hydrogen, methyl or phenyl.

2. A process according to claim 1 wherein the stable free nitroxyl radical, component a) and the phenolic antioxidant, component b) are added after an initial monomer conversion from 50% to 97%.

3. A process according to claim 1 wherein the polymerization is carried out as suspension polymerization.

4. A process according to claim 1 wherein the stable free nitroxyl radical is added in an amount of from 0.001 to 1% by weight, based on the weight of the initial vinyl chloride.

5. A process according to claim 1 wherein the phenolic antioxidant is added in an amount of from 0.001 to 1% by weight, based on the weight of the initial vinyl chloride.

6. A process according to claim 1 wherein the ratio of the phenolic antioxidant to stable free nitroxyl radical is from 20:1 to 1:20.

7. A process according to claim 1 wherein the reaction temperature is between 40° C. and 95° C. and the pressure between 5 and 30 bar.

8. A process according to claim 1 wherein the nitroxyl radical
  $G_1$, $G_2$, $G_3$, $G_4$ are methyl and $G_5$ and $G_6$ are hydrogen or $G_1$ and $G_3$ are methyl and $G_2$ and $G_4$ are ethyl, $G_5$ is methyl and $G_6$ is hydrogen;
  R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or of an aromatic carboxylic acid having 7 to 15 carbon atoms;
  R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms;
  p is 1;
  $R_1$ is $C_1$-$C_{12}$alkyl, $C_5$-$C_7$cycloalkyl or benzoyl; and
  $R_2$ is $C_1$-$C_{18}$alkyl, $C_5$-$C_7$cycloalkyl or a group of the formula of the formula —CO-Z wherein Z is hydrogen, methyl or phenyl.

9. A process for chain stopping vinyl chloride polymerization, which process comprises
  adding to a vinyl chloride polymerization reaction system
  a stable free nitroxyl radical of formula (I), (II), (III), (IV), (V), (VI), (VII), (VIII) or (IX)

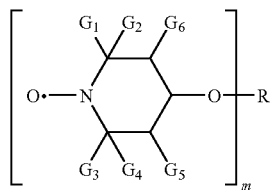
(I)

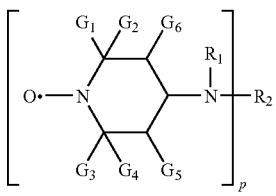
(II)

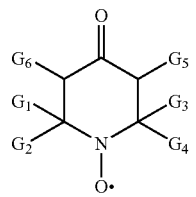
(III)

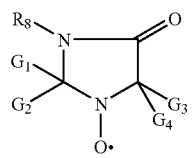
(IV)

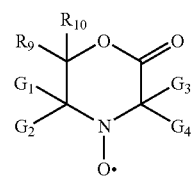
(V)

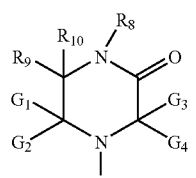
(VI)

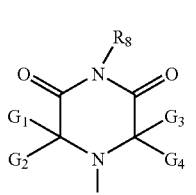
(VII)

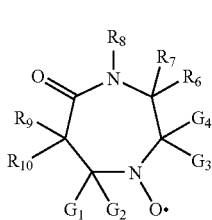
(VIII)

-continued

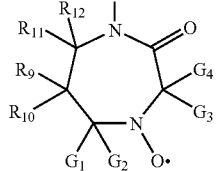
(IX)

wherein $G_1$, $G_2$, $G_3$, $G_4$ are independently alkyl of 1 to 4 carbon atoms or $G_1$ and $G_2$ or $G_3$ and $G_4$, or $G_1$ and $G_2$ and $G_3$ and $G_4$ together are pentamethylene, with the proviso that if $G_1$-$G_4$ are $C_1$-$C_4$alkyl at least one is ethyl, propyl or butyl;

$G_5$, $G_6$ are independently hydrogen or $C_1$-$C_4$alkyl;

R, if m is 1, is hydrogen, $C_1$-$C_{18}$alkyl which is uninterrupted or $C_2$-$C_{18}$alkyl interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms; or R is a monovalent radical of a carbamic acid or phosphorous containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms; or R is a divalent radical of a phosphorus-containing acid or a divalent silyl radical;

R, if m is 3, is a trivalent radical of an aliphatic, cycloaliphatic or aromatic tricarboxylic acid;

R, if m is 4, is a tetravalent radical of an aliphatic, cycloaliphatic or aromatic tetracarboxylic acid;

p is 1;

$R_1$ is $C_1$-$C_{12}$alkyl, $C_5$-$C_7$cycloalkyl or benzoyl;

$R_2$ is $C_1$-$C_{12}$alkyl, $C_5$-$C_7$cycloalkyl or a group of the formula —CO-Z wherein Z is hydrogen, methyl or phenyl;

$R_5$, $R_6$ and $R_7$ independently are hydrogen, $C_1$-$C_{18}$alkyl or $C_6$-$C_{10}$aryl;

$R_8$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_8$alkinyl which are substituted by one or more OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl, $C_7$-$C_9$-phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl; and $R_9$, $R_{10}$, $R_{11}$ and $R_{12}$ are independently hydrogen, phenyl or $C_1$-$C_{18}$alkyl, wherein the reaction system comprises initial unreacted vinyl chloride monomer or unreacted vinyl chloride monomer and partially polymerized vinyl chloride monomer.

10. A process according to claim 9 wherein $G_1$ and $G_3$ are methyl and $G_2$ and $G_4$ are ethyl, $G_5$ is methyl and $G_6$ is hydrogen; or $G_1$ and $G_2$ are ethyl and $G_3$ and $G_4$ are methyl; and $G_5$ and $G_6$ are hydrogen.

11. A process according to claim 9 wherein the stable free niroxyl radical is of formula (I), (II) or (III).
12. A process according to claim 1 wherein the phenolic antioxidant, component b), is of the formula
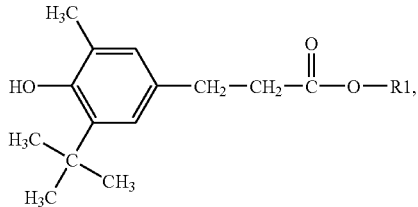
wherein $R_1$ is $C_1$-$C_{20}$alkyl or a group —$(CH_2$—$CH_2$—$O)_n$—$R_2$, wherein n is a number from 1-4 and $R_2$ is a group
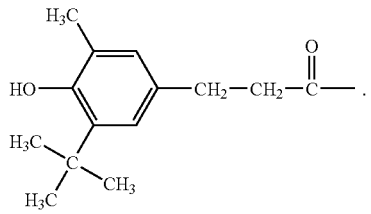
* * * * *